(12) United States Patent
Lin

(10) Patent No.: US 6,530,663 B2
(45) Date of Patent: Mar. 11, 2003

(54) PROJECTING DEVICE FOR DISPLAYING ELECTRICAL IMAGES

(75) Inventor: Shang-Yi Lin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 09/682,049

(22) Filed: Jul. 15, 2001

(65) Prior Publication Data

US 2002/0036752 A1 Mar. 28, 2002

(30) Foreign Application Priority Data

Aug. 17, 2000 (TW) .................................. 89116594 A

(51) Int. Cl.[7] ..................... G03B 21/00; G03B 21/14; G03B 21/28
(52) U.S. Cl. ..................... 353/33; 353/31; 353/20; 353/81
(58) Field of Search .................. 353/20, 31, 33, 353/34, 30, 81

(56) References Cited

U.S. PATENT DOCUMENTS

| 6,089,719 A | * | 7/2000 | Lin | 353/33 |
| 6,183,091 B1 | * | 2/2001 | Johnson et al. | 353/33 |
| 6,247,814 B1 | * | 6/2001 | Lin | 353/33 |
| 6,364,488 B1 | * | 4/2002 | Lin | 353/33 |
| 6,375,330 B1 | * | 4/2002 | Mihalakis | 353/31 |
| 2002/0003610 A1 | * | 1/2002 | Park et al. | 353/31 |

* cited by examiner

Primary Examiner—Russell Adams
Assistant Examiner—Andrew Sever
(74) Attorney, Agent, or Firm—Winston Hsu

(57) ABSTRACT

A projecting device for displaying electrical images. The projecting device has an illumination device for emitting a polarized trichrome light, three modulating devices for modulating three polarized monochrome lights to display the same electrical image, a light separating device having a first dichroic mirror and a third polarization beam splitting mirror arranged along a first diagonal direction and a first and a second polarization beam splitting mirrors arranged along a second diagonal direction, and a first retarder film installed between the second and the third polarization beam splitting mirrors. The first dichroic mirror, the first and second polarization beam splitting mirrors are used for separating the polarized trichrome light into three monochrome lights and passing each monochrome light to a correspondent modulating device for optical modulation. The three modulated lights reflected from the three modulating devices are transmitted to the third polarization beam splitting mirror and synthesized into an output light beam for displaying the electrical image.

11 Claims, 6 Drawing Sheets

PROJECTING DEVICE FOR DISPLAYING ELECTRICAL IMAGES

BACKGROUND OF INVENTION

1. Field of the Invention

The invention relates to a projecting device, and more specifically, to a projecting device for displaying electrical images.

2. Description of the Prior Art

Please refer to FIG. 1. FIG. 1 is a perspective view of a prior art projecting device 10 of an LCD projector. The projecting device 10 comprises a light source 12 that produces a white light beam, a uniform illumination optical device 14 installed in front of the light source 12 for converging the white light emitted from the light source 12, into a uniformly distributed rectangular light beam, a light separating device 16 for separating the rectangular light beam into red, green and blue color input light beams, a trichromic prism 18 having three input sides and an output slide for synthesizing the three input light beams into an output light beam, three modulating panels 20 each formed by a monochrome liquid crystal panel and separately installed in front of the three input sides of the trichromic prism 18 for modulating the three input light beams, three focusing lenses 17, 19 and 21 separately installed in front of the three modulating panels 20 for focusing the three input light beams from the light separating device 16 onto the three modulating panels 20, and a projecting lens 22 installed in front of the output side of the trichromic prism 18 for projecting the synthesized output light beam from the trichromic prism 18 onto a screen 24. Each of the modulating panels 20 is formed by a transparent monochrome liquid crystal panel for displaying a monochrome image. The is trichromic prism 18 synthesizes the three monochrome images to form the output color image.

The light separating device 16 comprises a first dichroic mirror 26 for separating the red light from the rectangular light beam, a reflecting mirror 27 for reflecting the red light from the first dichroic mirror 26 onto the focusing lens 17, a second dichroic mirror 28 for separating light reflected from the first dichroic mirror 26 by reflecting blue light to the focusing lens 19, and two optical lenses 30 and two reflecting mirrors 32 for passing and reflecting green light to the focusing lens 21. FIG. 1 clearly shows that the distance traveled by the green light is much longer than that of the red and blue lights. Since traveling distances affect light intensities, the two optical lenses 30 installed in front of the two reflecting mirrors 32 are essential to converge the green light so as to compensate for the loss of its light intensity.

However, the installation of the two optical lenses 30 makes a structure of the light separating device 16 complicated and costly. It is therefore an important objective to provide a projecting device with a simple structure that can solve the problem of unequal traveling distances for the three color beams.

SUMMARY OF INVENTION

It is therefore a primary objective of the present invention to provide a projecting device to solve the above mentioned problem.

Briefly, in a preferred embodiment, the present invention provides a projecting device comprising:

an illumination device for emitting a polarized trichrome light comprising three primary colors with various polarization;

a first, second and third modulating device, each modulating, reflecting, and changing the polarization of its own distinct polarized monochrome light;

a light separating device having a first dichroic mirror, a first polarization beam splitting mirror, a second polarization beam splitting mirror, and a third polarization beam splitting mirror, the first dichroic mirror and the third polarization beam splitting mirror being arranged along a first diagonal direction, and the first and the second polarization beam splitting mirrors being arranged along a second diagonal direction perpendicular to the first diagonal direction; and a first retarder film installed between the second and the third polarization beam splitting mirrors; wherein the first dichroic mirror separates the polarized trichrome light into a first polarized monochrome light and a polarized dichrome light, and transmits these two lights separately to the first and second polarization beam splitting mirror, the first polarization beam splitting mirror transmits the first polarized monochrome light to the first modulating device and transmits the modulated light reflected from the first modulating device to the third polarization beam splitting mirror, the second polarization beam splitting mirror separates the polarized dichrome light into second and third polarized monochrome lights which are directly transmitted to the second and third modulating devices, and then transmits the modulated lights reflected from the second and third modulating devices to the third polarization beam splitting mirror through the first retarder film, and the first retarder film changes the polarization of one of the modulated lights reflected from the second and third modulating devices, the modulated lights transmitted from the first and second polarization beam splitting mirrors are synthesized by the third polarization beam splitting mirror to form an output light beam.

It is an advantage of the present invention that the projecting device has a very simple structure.

It is another advantage of the present invention that the traveling distances of the three polarized light beams. are approximately equal and shorter than that of the prior art device.

These and other objects and the advantages of the present invention will no doubt become obvious to those of ordinary skill in the art after having read the following detailed description of the preferred embodiment that is illustrated in the various figures and drawings.

DETAILED DESCRIPTION

Figure 1:
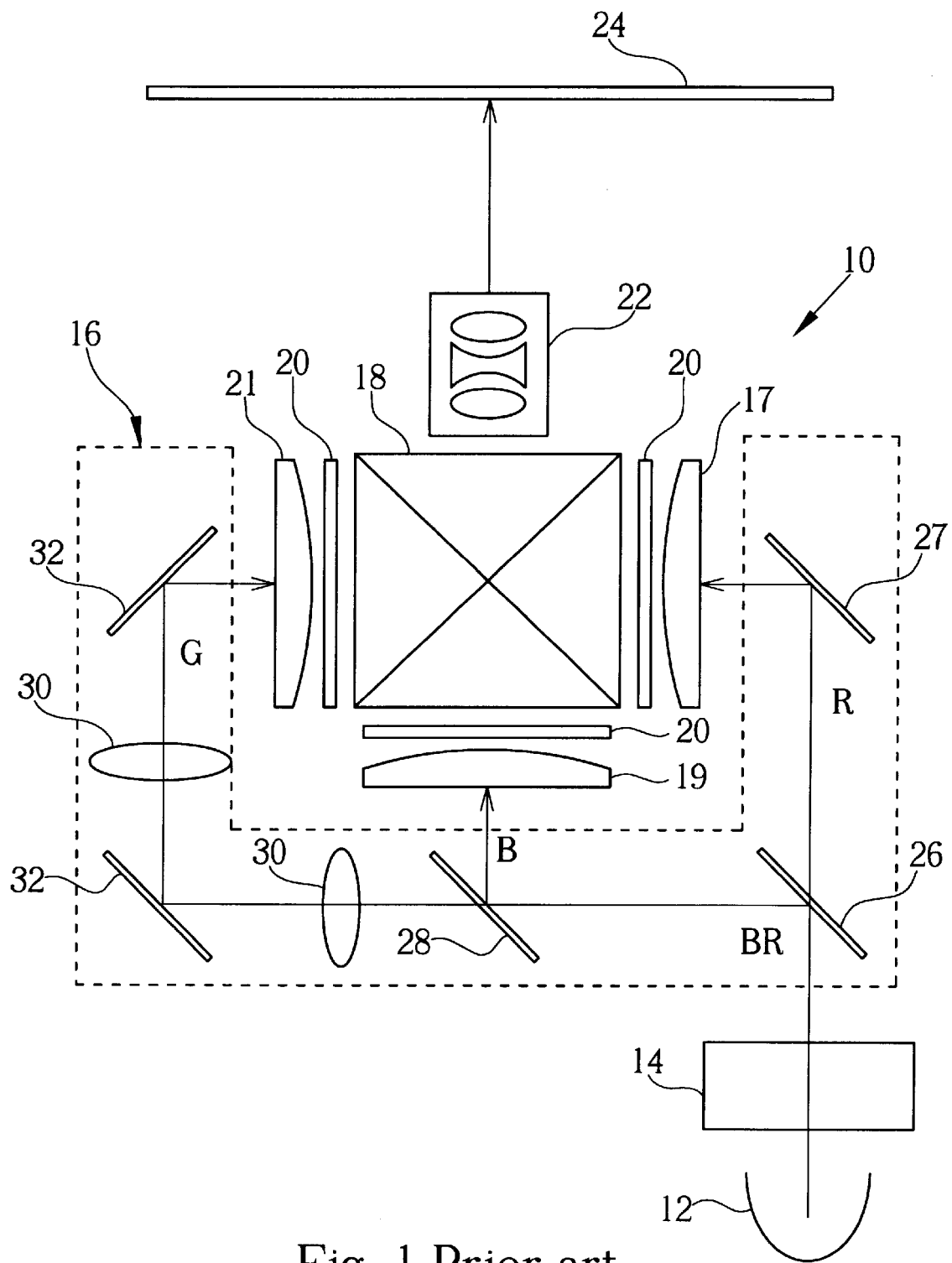
FIG. 1 is a perspective view of a prior art projecting device of an LCD projector.
Figure 2:
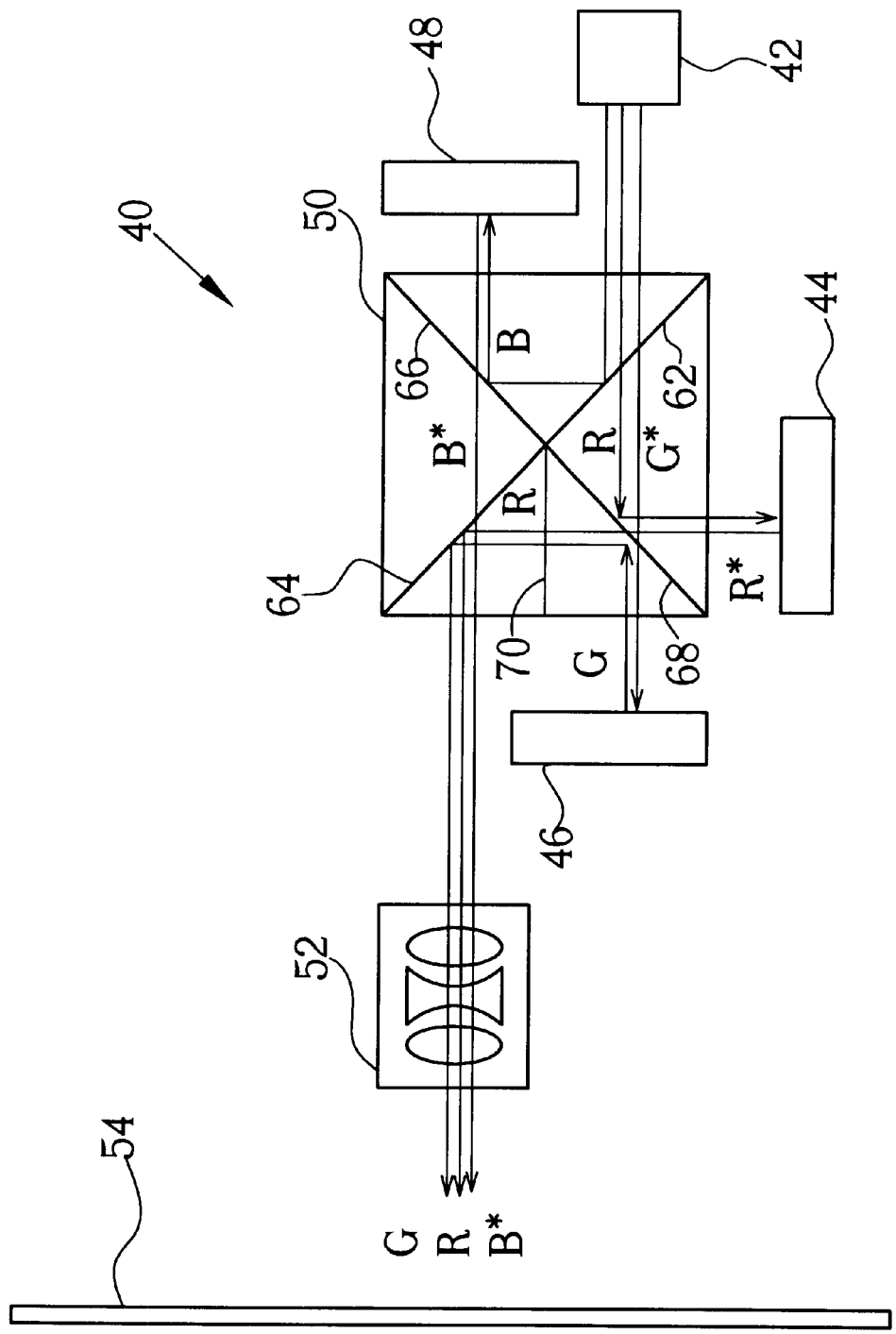
FIG. 2 is a perspective view of a projecting device of an LCD projector according to the present invention.
Figure 3:
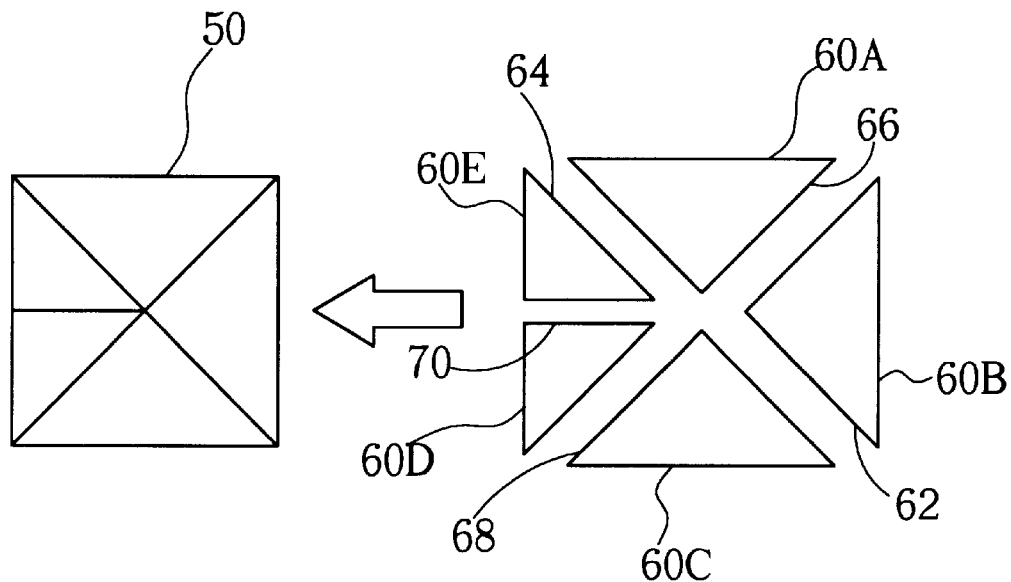
FIG. 3 is a schematic diagram of the dichroic-polarization beam splitter prism of the present invention.
Figure 4:
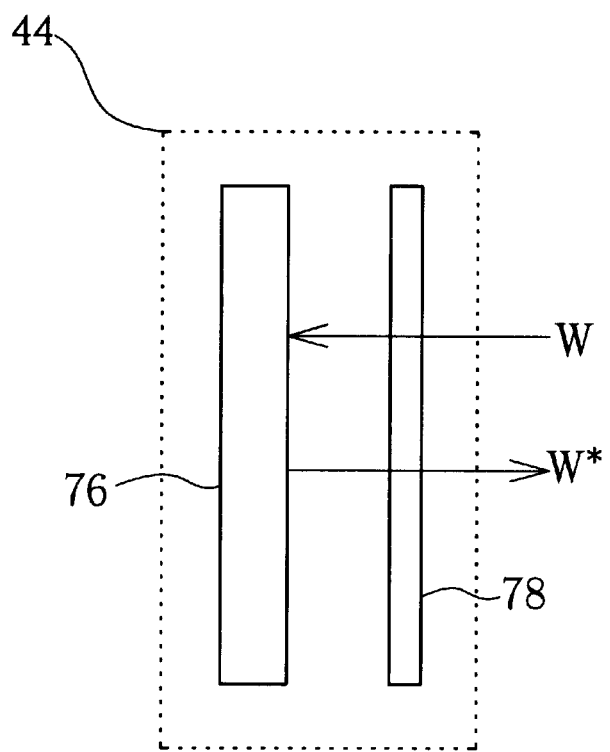
FIG. 4 is a schematic diagram of the modulation apparatus of the present invention.

Please refer to FIGS. 2 to 4. FIG. 2 is a perspective view of a projecting device 40 of an LCD projector according to the present invention. FIG. 3 is a schematic diagram of the dichroic-polarization beam splitter prism 50 of the present invention. FIG. 4 is a schematic diagram of the modulation apparatus 44 of the present invention. The projecting device 40 comprises an illumination device 42, three modulating devices 44, 46 and 48, a dichroic-polarization beam splitter prism 50 and a projecting lens 52. The illumination device 42 emits a uniformly distributed approximately white light beam which comprises red, green and blue colors, each with distinct polarizations. For example, the illumination device 42 of the present invention emits a polarized light comprising red R, green G* and blue B polarized lights wherein the polarization of the green G* polarized light is different from the other polarized lights R and B. The three modulating devices 44, 46 and 48 are used for modulating and shifting the polarization of the three polarized monochrome lights by utilizing a method involving reflection of light. The dichroic-polarization beam splitter prism 50 receives and sends the three polarized lights R, G* and B to the three corresponding modulating devices 44, 46, and 48 where each polarized light undergoes processing, modulation, and change in polarization with synthesizing of the three polarized monochrome lights and formation of an output light beam. The projecting lens 52 is installed in front of the output side of the dichroic-polarization beam splitter prism 50 for projecting the output light beam synthesized by the three polarized monochrome lights and emitted from the output side of the dichroic-polarization beam splitter prism 50 to a screen 54.

The dichroic-polarization beam splitter prism 50 comprises five triangular prisms 60A, 60B, 60C, 60D, 60E, each having a thin reflective coating on their interfaces. The dichroic-polarization beam splitter prism 50 further comprises a first dichroic mirror 62 and a third polarization beam splitting mirror 64 installed within the dichroic-polarization beam splitter prism 50 along the first diagonal line and the first polarization beam splitting mirror 66 and second polarization beam splitting mirror 68 are also installed within the dichroic-polarization beam splitter prism 50 along the second diagonal line perpendicular to the first and second dichroic mirrors. The dichroic-polarization beam splitter prism 50 further comprises a first retarder film 70 installed between the second and the third polarization beam splitting mirrors 68, 64.

Each of the three modulating devices 44, 46 and 48 comprises a mirror-type light modulator 76 for modulating and reflecting an incident light to generate a modulated light, and a quarter-wave retarder 78 for retarding both the incident light and modulated light by a quarter of a wavelength so that the incident light of the modulating device and the modulated light generated by the modulating device have opposite polarizations. The mirror-type optical modulator 76 can be a digital micro-mirror device or a mirror-type liquid crystal display.

Figure 8:
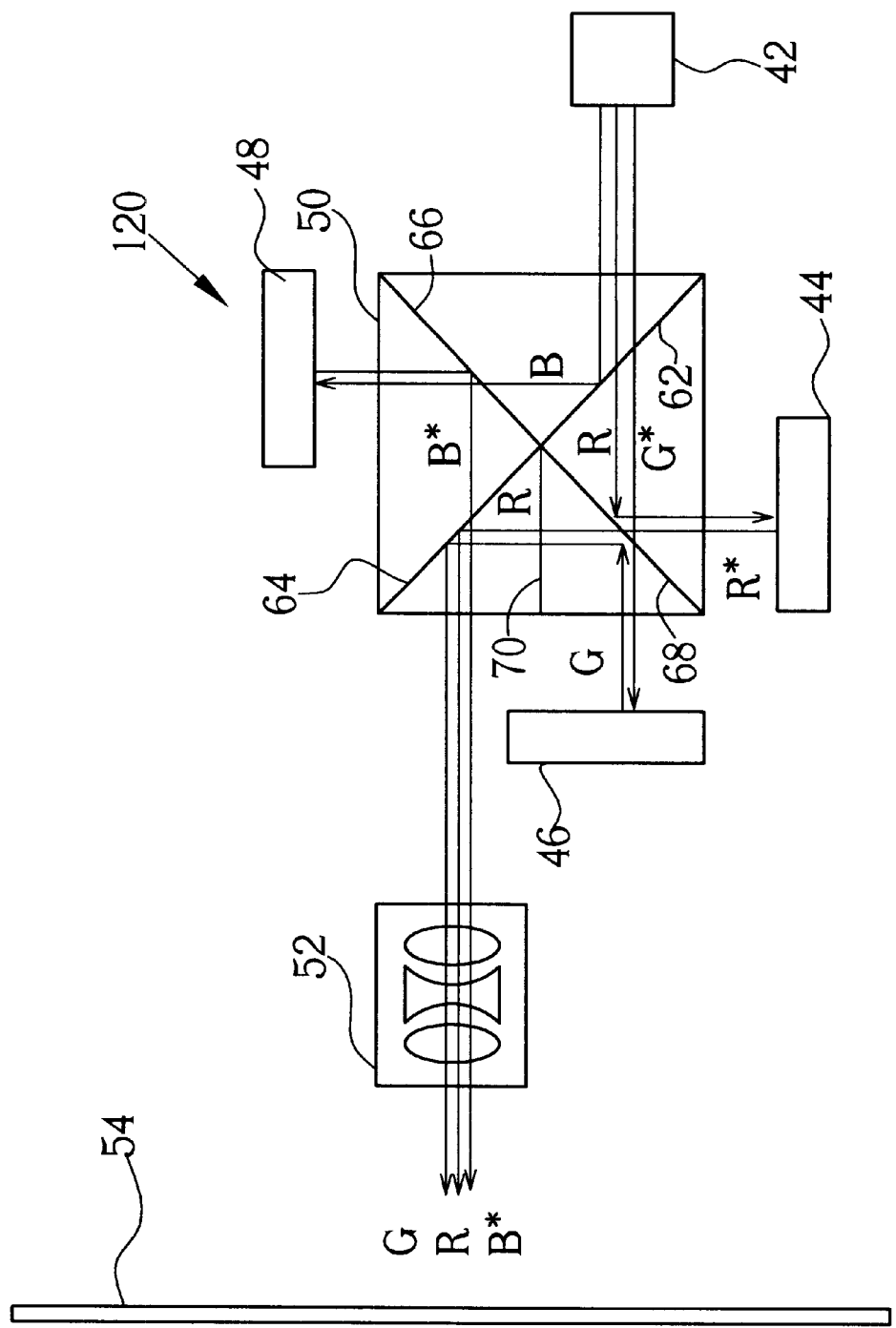
FIG. 8 is a perspective view of another projecting, device of an LCD projector according to the present invention.

As shown in FIG. 2, after the polarized trichrome light omitted from the illumination device 42 enters the dichroic-polarization beam splitter prism 50, it is separated by the first dichroic mirror 62 into a first blue polarized monochrome light B and a polarized dichrome light consisting of a red polarized light R and green polarized light G*. The blue polarized light B is reflected by the first dichroic mirror 62 and therefore transmitted to the first polarization beam splitting mirror 66. The red polarized light R and green polarized light G* light penetrate through the first dichroic mirror 62 and to therefore transmitted to the second polarization beam splitting mirror 68. The first polarization beam splitting mirror 66 has a special coating and can reflect an S-STATE polarized light and pass a P-STATE polarized light. Thus, the blue polarized light B is transmitted by the first polarization beam splitting mirror 66 to the first modulating device 48 which forms and reflects a modulated light B* which is transmitted by the first polarization beam splitting mirror 66 to the third polarization beam splitting mirror 64. Of course, another embodiment of a present invention projecting device 120 shown in FIG. 8 comprises the first polarization beam splitting mirror 66 having a special coating that can reflect a P-STATE polarized light and pass an S-STATE polarized light. In this embodiment, the blue polarized light B is transmitted through the first polarization beam splitting mirror 66 to the first modulating device 48 which forms and reflects a modulated light B* which is reflected by the first polarization beam splitting mirror 66 to the third polarization beam splitting mirror 64. The second polarization beam splitting mirror 68 passes P-STATE polarized light and reflects S-STATE polarized light so that the red polarized light R is reflected to the second modulating device 44 where it is modulated into red polarized light R* and the green polarized light G* is transmitted to the third modulating device 46 where it is modulated into green polarized light G. Both modulated lights (R* & G) are transmitted by the second polarization beam splitting mirror 68 to the first retarder film 70. The first retarder film 70 will change the polarization of the red light but not the green light. Thus, after passing through the first retarder film 70, the modulated light R* will becomes R, and the modulated light G will be still G. Finally, the third polarization beam splitting mirror 64 will pass the blue polarized light B* and reflect the red polarized light R and green polarized light G into the projecting lens 52 to form a synthesized polarized trichrome light B*GR which is projected onto the screen 54. The simple structure of the projecting device 40 of the present invention uses the dichroic-polarization beam splitter prism 50 to separate and synthesize the trichrome light beam where the traveling distances for each of the polarized light beams are approximately equal and shorter than the distances of the input light beams of the prior art projecting device 10.

The dichroic-polarization beam splitter prism 50 uses a set of one dichroic mirrors 62 and three polarization beam splitting mirrors 66, 68, 64 to separate and individually modulate the three polarized lights. Therefore, the illumination device 42 must provide the dichroic-polarization beam splitter prism 50 with a polarized trichrome light comprising a polarized monochrome light and a dichroic polarized light with a different polarization for final output of a perfectly synthesized trichrome light beam.

Figure 5:
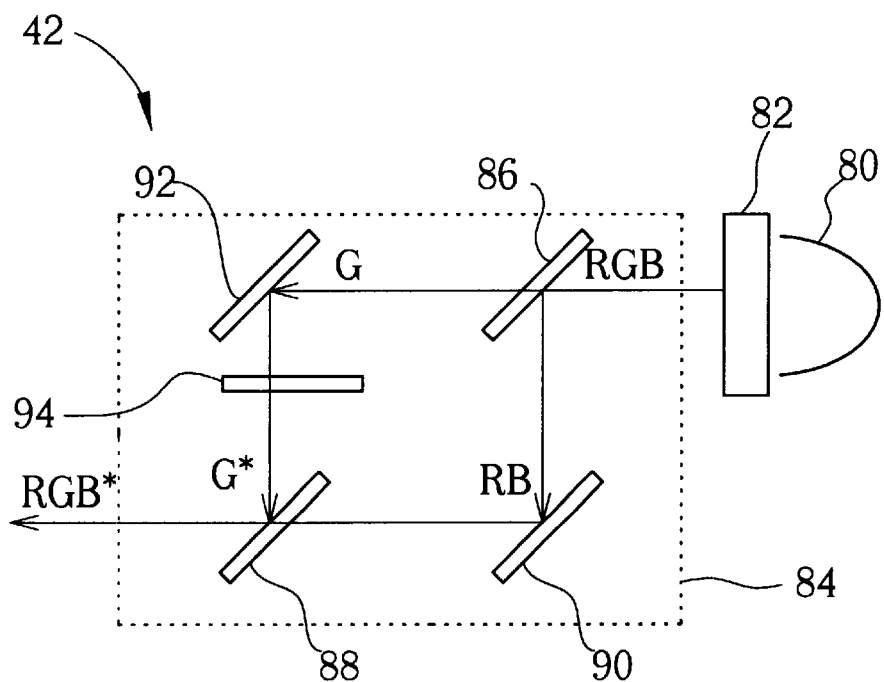
FIG. 5 is a schematic diagram of the illumination device of the projecting device of an LCD projector shown in FIG. 2.

Please refer to FIG. 5. FIG. 5 is a schematic diagram of the illumination device 42 of the projecting device 40 of an LCD projector. The illumination device 42 comprises a light source 80 for generating a trichrome unpolarized light RR*GG*BB* which comprises red, green and blue lights, a light polarizing device 82 for transforming the trichrome unpolarized light RR*GG*BB* into a polarized trichrome light RGB, and a light separating device 84 for separating the polarized trichrome light RGB into a green polarized light G and a polarized dichrome light RB. The light separating device 84 further comprises two dichroic mirrors 86, 88 for separating the green polarized light G from the polarized trichrome light RGB and synthesizing the green polarized light G* into a polarized trichrome light RG*B, two reflecting mirrors 90, 92 for reflecting the green polarized light G and the polarized dichrome light RB, and a half-wave retarder 94 for retarding and modulating the green polarized light G into the green polarized light G*. As shown in FIG. 2, the illumination device 42 outputs a polarized trichrome light RG*B to the first dichroic mirror 62 of the dichroic-polarization beam splitter prism 50.

Figure 6:
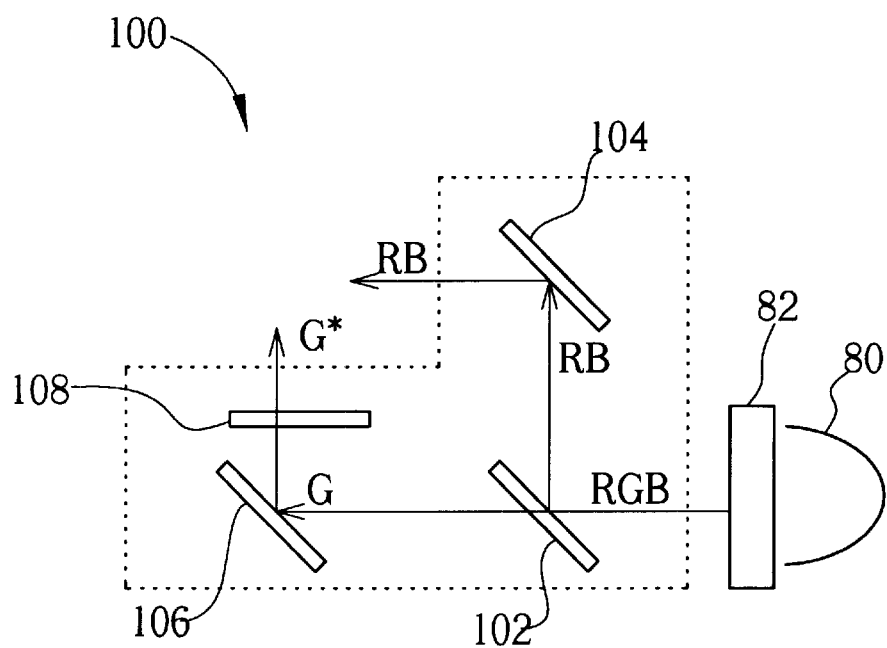
FIGS. 6 and 7 are schematic diagrams of the alternative light separating device and projecting device of an LCD projector, respectively, according to the present invention.
Figure 7:
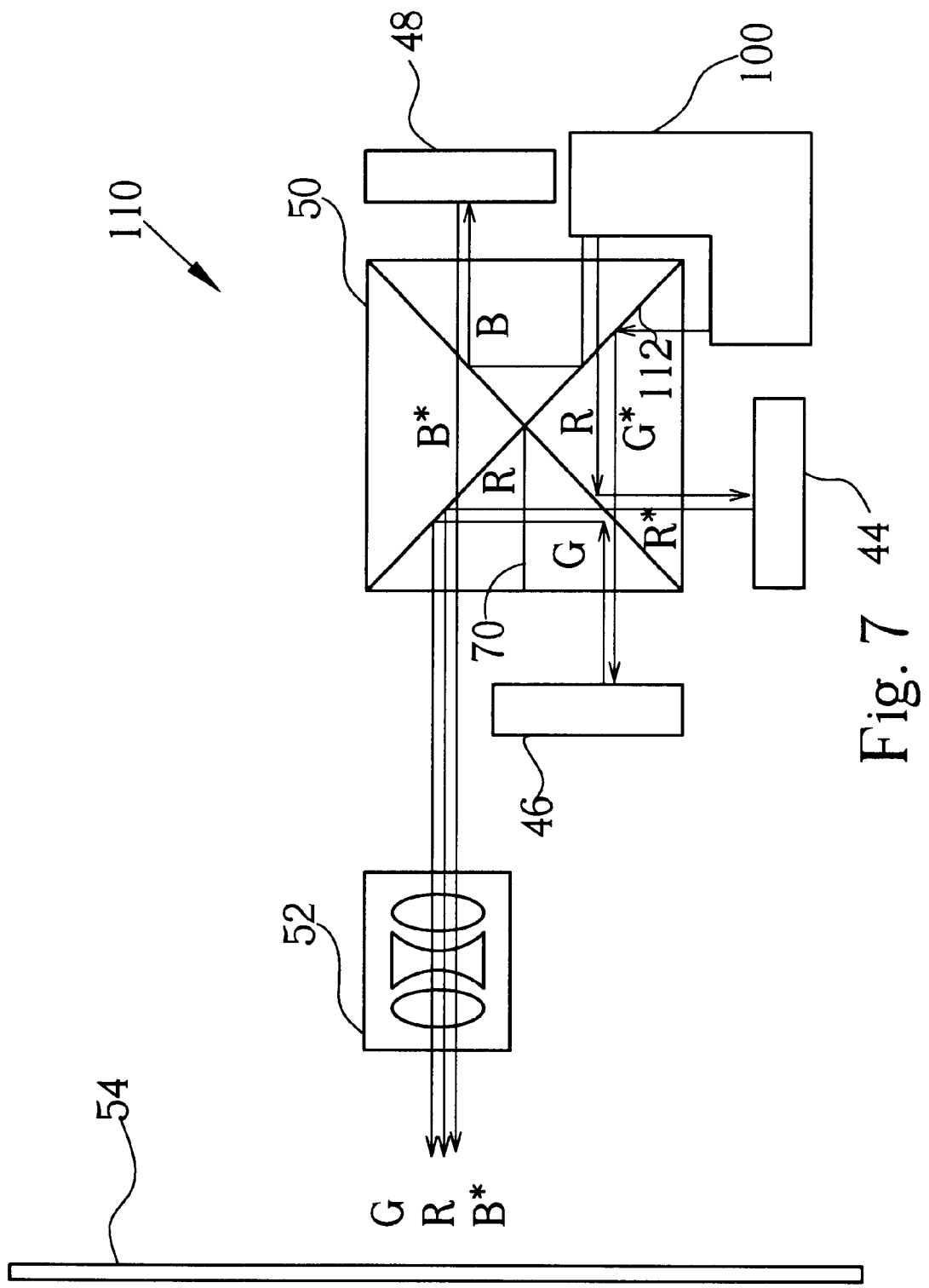

Please refer to FIG. 6 and FIG. 7. FIGS. 6 and 7 represent schematic diagrams of an alternative light separating device 100 and a projecting device 110 of an LCD projector, respectively, according to the present invention. The light separating device 100 has a far simpler structure than the previously described light separating device 84 and comprises a dichroic mirror 102, two reflecting mirrors 104 and 106, and a half-wave retarder 108. The output orientation of the green polarized light G* is perpendicular to that of the polarized dichrome light RB. Unlike the previously described dichroic mirror 62, the dichroic mirror 112 shown in FIG. 7 is coated to reflect both the green polarized light G* and the blue polarized light B while passing the red polarized light R.

Additionally, in this embodiment, the first retarder film 70 shown in FIG. 2 changes the polarization of the red light but not the green one. However, a retarder film which can change the polarization of the green light but not the red one can also be used to replace the first retarder film 70 if an alternative retarder film is installed between the first and the third polarization beam splitting mirrors 66, 64. In this manner, the polarization of the blue light (B) reaching the third polarization beam splitting mirror 64 is different from the polarization of the red and green lights (R*, G*). The third polarization beam splitting mirror 64 will reflect the polarized light B and pass the polarized lights R*, G* to form a synthesized polarized trichrome light BG*R* which is projected onto the screen 54.

From the foregoing, it is clear that the projecting devices 40 and 110 of the present invention are simple in structure and provide approximately equal light traveling distances that are shorter than that of the prior art device projecting device 10. Thus, special optical lenses to compensate for the loss of light intensity are not needed in projecting devices 40 and 110 thereby simplifying the structure, lowering manufacturing costs, and improving image quality.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. a projecting device comprising:
   an illumination device for emitting a polarized trichrome light which comprises red, green and blue lights;
   three modulating devices defined as first, second, and third modulating devices, each of the modulating devices being used for reflecting a polarized monochrome light to modulate it and change its polarization; and
   a rectangular trichromatic prism comprising a first dichroic mirror, a first polarization beam splitting mirror, a second polarization beam splitting mirror, a third polarization beam splitting mirror, and a first retarder film, the rectangular trichromatic prism having a first diagonal line and a second diagonal line approximately perpendicular to each other, wherein the first dichroic mirror and the third polarization beam splitting mirror are installed inside the rectangular trichromatic prism along the first diagonal line, the first and second polarization beam splitting mirrors are installed inside the rectangular trichromatic prism along the second diagonal line, and the first retarder film is installed inside the rectangular trichromatic prism between the second and the third polarization beam splitting mirrors,
   wherein the first dichroic mirror transfers the polarized trichrome light into a first polarized monochrome light and a polarized dichrome light, and transmits these two lights separately to the first and second polarization beam splitting mirror, the first polarization beam splitting mirror transmits the first polarized monochrome light to the first modulating device and transmits the modulated light reflected from the first modulating device to the third polarization beam splitting mirror, the second polarization beam splitting mirror separates the polarized dichrome light into second and third polarized monochrome lights which are directly transmitted to the second and third modulating devices, and then transmits the modulated lights reflected from the second and third modulating devices to the third polarization beam splitting mirror through the first retarder film, and the first retarder film changes the polarization of one of the modulated lights reflected from the second and third modulating devices, the modulated lights transmitted from the first and second polarization beam splitting mirrors are synthesized by the third polarization beam splitting mirror to form an output light beam.

2. The projecting device of claim 1 further comprising a projecting lens for projecting the output light beam from the third polarization beam splitting mirror onto a screen.

3. The projecting device of claim 1 wherein the polarized trichrome light emitted from the illumination device comprises a polarized monochrome light and a polarized dichrome light which are transmitted to the first dichroic mirror from the opposing sides of the first dichroic mirror.

4. The projecting device of claim 1 wherein the polarized trichrome light emitted from the illumination device is a single light beam which is directly transmitted to the first dichroic mirror.

5. The projecting device of claim 1 wherein the first polarization beam splitting mirror reflects the first monochrome light to the first modulating device, and then the modulated light reflected from the first modulating device is transmitted through the first polarization beam splitting mirror and passed to the third polarization beam splitting mirror.

6. The projecting device of claim 1 wherein the first monochrome light is transmitted through the first polarization beam splitting mirror and passed to the first modulating device, and then the modulated light reflected from the first modulating device is reflected to the third polarization beam splitting mirror by the first polarization beam splitting mirror.

7. The projecting device of claim 1 wherein the second polarized monochrome light is reflected to the second modulating device by the second polarization beam splitting mirror and the third polarized monochrome light is transmitted to the third modulating device by transmitting through the second polarization beam splitting mirror, the modulated light reflected from the second modulating device is transmitted to the third polarization beam splitting mirror by transmitting through the second polarization beam splitting mirror, and the modulated light reflected from the third modulating device is reflected to the third polarization beam splitting mirror by the second polarization beam splitting mirror.

8. The projecting device of claim 1 wherein each of the modulating devices comprises a mirror-type optical modulator for modulating an incident light to generate a modulated light, and a quarter-wave retarder for retarding both the incident light and the modulated light by a quarter wavelength so that the incident light of the modulating device and the modulated light generated by the modulating device have opposite polarizations.

9. The projecting device of claim 8 wherein the optical modulator is a digital micro-mirror device.

10. The projecting device of claim 8 wherein the optical modulator is a liquid crystal display panel.

11. The projecting device of claim 1 wherein the illumination device comprises a light source for generating a trichrome unpolarized light which comprises red, green and blue lights, a light polarizing device for converting the trichrome unpolarized light into a polarized trichrome light, a light separating device for separating the polarized trichrome light into a monochrome light and a dichrome light, and a retarder for changing the polarization of the monochrome light or dichrome light to generate the trichrome light of various polarizations.

* * * * *